United States Patent [19]
Kobussen et al.

[11] Patent Number: 6,013,295
[45] Date of Patent: Jan. 11, 2000

[54] METHOD FOR LINKING COEXTRUDED FOODSTUFF

[75] Inventors: Mart Kobussen, Indianola, Iowa; Jaap Kobussen, La Veghel, Netherlands; Jos Kobussen, Indianola, Iowa

[73] Assignee: Townsend Engineering Company, Des Moines, Iowa

[21] Appl. No.: 09/036,548

[22] Filed: Mar. 6, 1998

[51] Int. Cl.⁷ .......................... A22C 11/00; A22C 13/00; A23L 1/317
[52] U.S. Cl. .......................... 426/277; 426/513; 426/516
[58] Field of Search .......................... 426/277, 513, 426/516, 140; 452/32, 46, 47, 48

[56] References Cited

U.S. PATENT DOCUMENTS 3,191,222   6/1965   Townsend .
3,622,353  11/1971   Bradshaw et al. ................ 426/513 X
4,556,708  12/1985   Andrae et al. .................... 426/140 X
5,344,917   9/1994   Furukawa et al. ................ 426/277 X
5,759,602   6/1998   Kobussen et al. ................ 426/513 X

FOREIGN PATENT DOCUMENTS

93/12660   7/1993   WIPO .

Primary Examiner—Arthur L. Corbin
Attorney, Agent, or Firm—Zarley, McKee, Thomte, Voorhees & Sease

[57]  ABSTRACT

A method and means for linking a co-extruded food product strand wherein said strand is stretched after it is extruded and before it is linked.

4 Claims, 2 Drawing Sheets

METHOD FOR LINKING COEXTRUDED FOODSTUFF

BACKGROUND OF THE INVENTION

The present invention relates to the preparation of collagen-coated foodstuffs, especially sausages.

There are two approaches to making sausages. The first is to take natural or artificial sausage casing and stuff it with sausage meat. In recent times, it has become known to co-extrude a strand of sausage material which has an inner core of meat emulsion having an outer surface material that can be coagulated to provide an encasement for the strand. The outer surface material may consist of a gel with a collagen protein.

A typical sausage coextrusion process is described in U.S. Pat. No. 622,353 Bradly, et al. In practice this process includes the steps of co-extruding a substantially uniform layer of collagen gel around an edible product, whereby the collagen is coagulated by passing the extruded sausage strand through a brine bath, subsequently crimp/cutting the strand into individual sausage links and successively air drying these links.

The linking is done by a so-called crimping-wheel. For instance described in U.S. Pat. No. 5,104,349 to Van Der Dungen, et al., a crimping wheel normally has a horizontal axis, and has a plurality of crimping units mounted on its circumference. These crimping units are spaced apart to form the required sausage length. The crimping units consist of two oppositely oriented V-shaped members to form a scissors. Said members are brought together through a cam on the wheel, to first constrict the sausage strand and subsequently separate the links.

Usually the sausage rope is fed to the crimping-wheel at the wheel's top, to have the sausage links drop from the wheel lower end. In between the crimping units the sausage strand is usually supported to prevent the breaking of the casing which at this point of process is still relatively weak. The speed of the linker is equal to that of the coextrusion unit so that no tension is exerted on the rope.

In more recent times developments have led to coextrusion processes which give a stronger casing, making it practically possible to twist-link the sausage strand and/or hang it. See for instance our International Patent application Wo 94/11474 to Kobussen, et al.

In International Patent application WO 94/23584 to Hanlon, et al. a linking wheel is provided which twist-links a coextruded sausage strand and subsequently hangs the linked sausages onto a conveyor. This disclosure describes similar v-shaped crimping units on a rotating wheel. Between the crimping units roller means are applied to twist the sausage rope around the longitudinal axis.

All previously known methods of linking a co-extruded sausage strand have not dealt sufficiently with the irregular shaped sausage as a result of these processes.

Regardless of which linking method is used, sausage meat is pushed aside from the linking points which results in a so-called dumbbell shape of the sausage, which is an expansion of sausage diameter at sausage ends. Particularly for co-extrusion, this is a problem since the casing produced is more flexible than natural or prefabricated casings, and can therefore not give the necessary casing strength to withstand the dumbelling effect.

Other irregularities of sausage shape can also be contributed to the fact that the extruded sausage emulsion defines the shape of the end-product as the collagen is coagulating around it. As opposed to preformed casings, where the meat is stuffed into a given confinement which sets the sausage shape, these irregularities are more predominant with course ground meat emulsions, as compared to relatively fluid frankfurter-type meat doughs.

Irregularities are particularly problematic for fresh sausage products. Cooked type products are often further processed, and this further processing can be used to minimize unwanted irregular product shape. Fresh sausage, after coextruding, coagulating and linking, are often quickly fried or baked which increases the irregularities.

In addition to the lower value of irregular shaped sausages, they tend to split or break during cooking. Dumbelling particularly creates excessive expansion of meat from the sausage ends, because during cooking the casing shrinks while the meat batter expands. This is particularly so with fresh sausage, wherein breakage of the casing often occurs.

It is therefore a principal object of the present invention to provide a method for manufacturing co-extruded food strands with an edible casing in which the previous problems and disadvantages of the known co-extrusion methods do not occur.

It is a further object of the present invention to provide a novel method for reducing unwanted irregular shape of a co-extruded food product.

It is still a further object of the present invention to provide a novel method for reducing unwanted dumbelling of a co-extruded food product.

It is still a further object of the present invention to provide a novel method for substantially reducing breakage of co-extruded sausage links during cooking.

An additional object of the present invention is to create by co-extrusion a substantially uniform layer of a collagen containing gel around an elongated strand of foodstuff and coagulating the foodstuff by contacting it with a salt containing brine, and stretching the strand before linking it.

These and other objects will become clear from the following description of the present invention.

SUMMARY OF THE INVENTION

The present invention discloses a method of producing a co-extruded sausage strand, by stretching said strand before linking it to individual sausages. Said stretching is obtained by a higher linear processing speed of the linking machine compared to the co-extrusion machine, which means that the longitudinal displacement of the strand by the linker is slightly greater than that of the co-extrusion machine.

DETAILED DESCRIPTION OF THE PREFERRED EMBODIMENT

Figure 1:
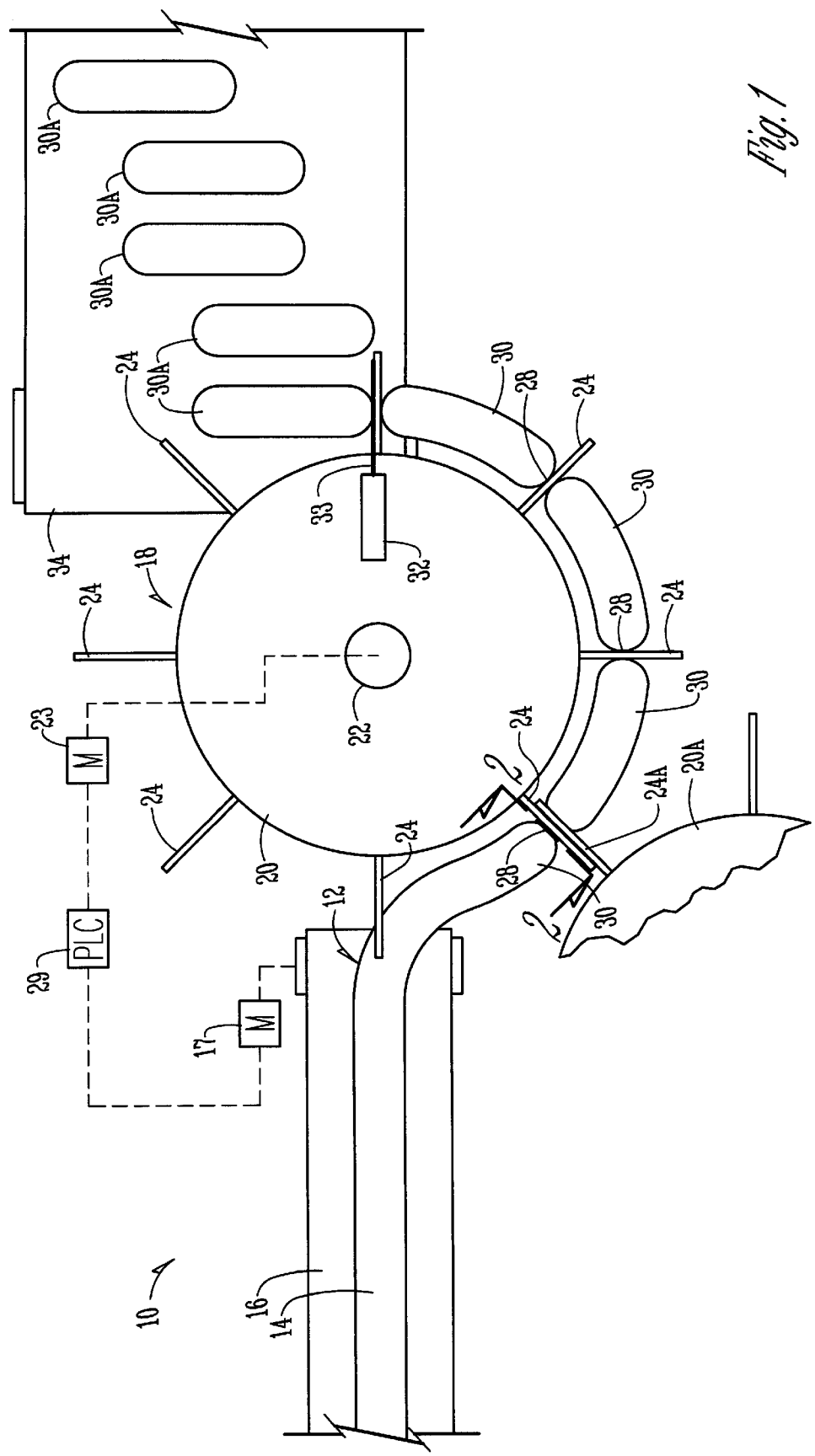
FIG. 1 is a schematic plan view of the co-extrusion unit and linking unit of this invention.

The present invention provides a process for linking co-extruded food strands having a casing comprised of a coagulated collagen containing gel casing surrounding the edible strand, such as sausages. Co-extrusion methods are mainly being used for co-extrusion of sausage or sausage like materials. While the instant process relates particularly to the manufacturing of sausages, it may also be used in the production of other collagen coated foodstuffs, such as fish or meat products containing vegetable or cheese or both. The term "sausage" as used herein refers to any type of emulsified food product that is formed into sausage or frankfurter links or the like.

The invention is neither limited to collagen coated foodstuffs, but may also be applied for co-extruding foodstuffs with a different kind of coating material such as casein, soy, wheat, cellulose, alginate, chitosan or starch based gels.

The term "fresh sausage" as used herein is meant to be co-extruded sausage product which is not subjected to prolonged cooking treatment in combination with smoking treatment. The sausage is cooked for only a short period, usually not by the producer but at the retail or consumer level, typically by pan or deep fat frying or baking.

It is known in the art to link the endless sausage rope produced in the co-extrusion process. All existing linking methods push away the meat emulsion from the linking points before cutting, twisting, clipping etc., and this gives unwanted irregularities such as dumbelling. It also effects sausage cooking, causing bursting, and extrusion of meat from sausage ends. These negative cooking effects are particularly predominant for fresh sausage products.

This invention is based upon the discovery that when the sausage strand is stretched after coagulation and before linking, a better more evenly shaped sausage product is obtained, with much more desirable cooking characteristics. The reason for this is that when the sausage strand is stretched, the casing diameter is reduced and the meat emulsion therein is compressed inwardly. The sausage becomes firmer, which dramatically improves the appearance of the sausages after linking and after cooking.

The amount of stretch that is applied varies by the sausage product. Meat emulsion consistency, further processing methods, and casing strength and flexibility are amongst other factors involved. Preferably though the longitudinal stretch is between 1–30% in length.

As casing strength and flexibility is very important, it was found that this invention is preferably used in combination with the use of the coagulation method described in co-pending application U.S. patent application Ser. No. 08/990,619 filed Dec. 15, 1997. It is therefore preferably used with coagulation solution using a highly dissolvable salt (selected from the group consisting of potassium carbonate and dipotassium phosphate) with a dissolution rate of at least 8 moles/liter water at 20° C. The brine contact time is preferably between 20–60 seconds, while the collagen gel has a dry matter content of between 3–25%.

It has also been found particularly suitable to increase the flexibility of the casing by incorporating an agent in the gel for flexibilization of said casing. Plasticizers such as glycerin may be used for this purpose.

The numeral 10 designates the discharge end of a coextrusion machine which produces an elongated sausage strand 12 having an outer surface 14 comprised of a coagulated collagen gel, all in accordance with U.S. Pat. No. 5,759,602, which is incorporated herein by reference. The numeral 16 designates a conventional discharge belt conveyor. Conventional rotatable power motor 17 powers conveyor 16 to longitudinally discharge strand 12 therefrom at a given speed, e.g., 0.87 mm/sec.

Figure 2:
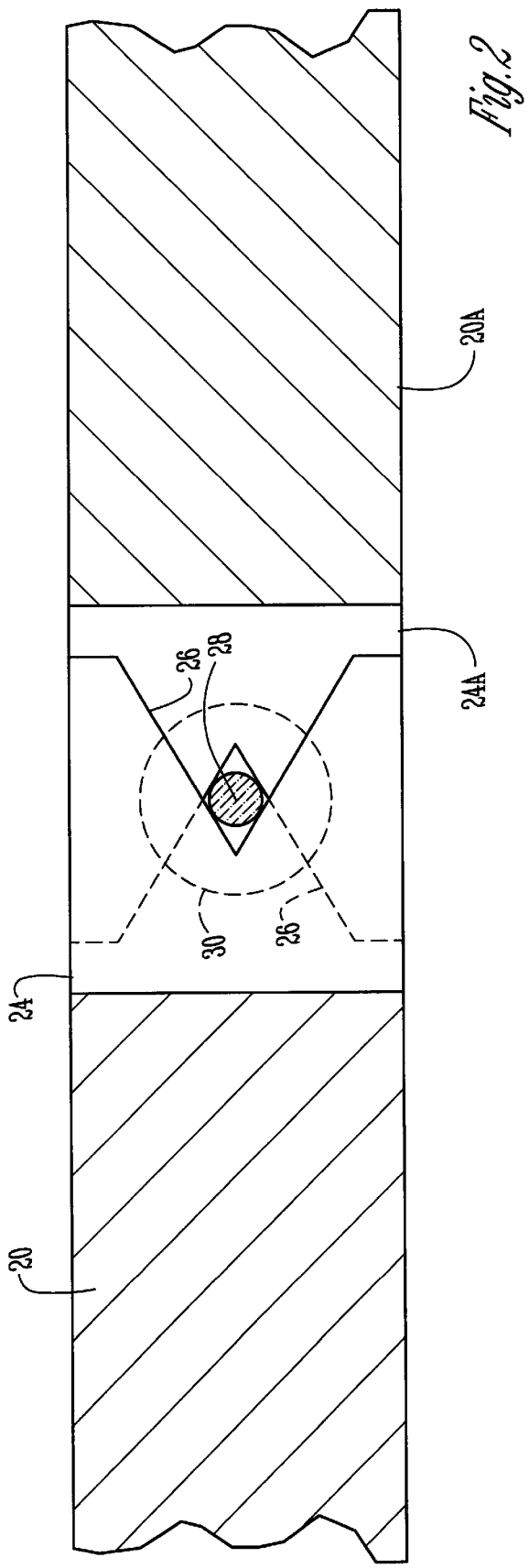
FIG. 2 is a sectional view taken on line 2—2 of FIG. 1.

A linker 18 comprises wheel 20 which rotates on vertical shaft 22 which is also connected to a source of rotatable power 23. A plurality of spaced linker elements or plates 24 extend radially outwardly from the perimeter of wheel 20. A horizontally disposed V-shaped notch 26 is formed on the outward ends of linker elements. Shaft 22 is aligned with conveyor 16, and wheel 20 is of such a diameter, that linker elements 24 engage the strand 12 within the confines of notches 26. The tapered notches "grasp" the strand and constrict its diameter to create link points 28 in the strand. If desired, a twin wheel 20A with twin linker elements 24A having notches 26 can be mounted radially beyond the periphery of wheel 18 to also engage strand 12 (FIG. 1). The overlapping linker elements 24 and 24A (FIG. 2) uniformly crimp the linker 30 at the link points 28. Sausage linker elements 24 and 24A are conventional and do not of themselves constitute the present invention. The linker elements also impart a longitudinal pulling action on the strand 12 as the strand 12 departs the conveyor 16. The rotational speed of the wheel 20 is controlled to impart a longitudinal displacement of strand 12 at a slightly greater speed than the longitudinal speed of the strand as it leaves conveyor 16. The relative speed of conveyor 16 and linker 18 are coordinated and controlled by computer 29 which is operatively connected to motors 17 and 23 where the motor can be individually controlled. A typical speed of the linker elements 24 at the location of link points 28 is about 0.9 m/s which is slightly faster than the longitudinal speed of strand 12 as it leaves conveyor 16. This speed differential imposed by the linker 18 on strand 12 as compared to the speed of the strand as it leaves conveyor 16 exerts some tension on the link 30 as it leaves conveyor 16. This tension stretches the links 30 as more fully described below.

A conventional link cutter 32 (FIG. 1) with reciprocal cutting blade 33 is mounted above wheel 20 to automatically cut the strand at the link point 28 that passes thereunder, whereupon the separated link 30A drops to conveyor 34 to be carried to a further discharge station. The conventional cutter 32 does not of itself constitute this invention. The blade 33 can be timed with the rotation of wheel 20 so that the cutting action takes place only as the links 30 are in the position shown in FIG. 1.

The stretching of the sausage rope 12 is preferably achieved by having the linking machine 18 run faster than the extrusion machine 10. Preferably, the linking and coextrusion machines 18 and 10 are linked together in a flexible program that can be adjusted to the optimum speed differential therebetween. The speed differential will vary with each sausage product, for it depends on the desired sausage diameter, evenness, length, etc.

Example 1

Production of Fresh Co-extruded Sausages

| 1 | Linking speed mm/sec | 0.9 | 0.9 | 0.9 | 0.9 | 0.9 | 0.9 |
|---|---|---|---|---|---|---|---|
| 2 | Co-extrusion speed mm/sec | 0.87 | 0.84 | 0.81 | 0.78 | 0.75 | 0.72 |
|   | Speed differential 1:2 | 3.3% | 6.7% | 10.0% | 13.3% | 16.7% | 20.0% |
|   | Pan fry: broken | 18 | 12 | 9 | 10 | 3 | 0 |
|   | Pan fry: unbroken | 82 | 88 | 91 | 90 | 97 | 100 |

This table shows various settings of the speed differential. In this case the best speed differential is 20.0%, for a fresh pork sausage, 100 millimeters in length. The sausage grading is done by counting the number of sausages which do not cook well and which experience bursting, splitting, etc.

From the foregoing, it is seen that the stretching of links 30 permits this invention to achieve at least all of its stated objectives.

What is claimed is:

1. A process for linking a co-extruded food product comprising:

co-extruding a strand of food material and a casing forming gel to create a substantially uniform layer of the casing forming gel around the strand of food material, covering said strand with a coagulation solution to coagulate said casing forming gel and form a casing around said strand at a first longitudinal speed, and linking said strand and said casing at a second longitudinal speed, which is greater than said first longitudinal speed, to simultaneously stretch said strand and casing and to create a plurality of links in the stretched strand and casing.

2. A process according to claim 1 wherein the speed differential between said first and second speeds is greater than 5%.

3. A process according to claim 1 wherein said first speed is between 0.87 mm/second–0.72 mm/second and said second speed is approximately 0.9 mm/second.

4. A process according to claim 1 wherein said first longitudinal speed is the longitudinal speed at which said strand is supplied to a linker, and said second longitudinal speed is the longitudinal speed of the strand as it passes through said linker.

* * * * *